United States Patent
Kassulat et al.

(10) Patent No.: US 6,880,803 B2
(45) Date of Patent: Apr. 19, 2005

(54) CLOSURE DEVICE FOR THE FLUID DELIVERY LINE OF A HIGH-PRESSURE CLEANING APPARATUS

(75) Inventors: Bernd Kassulat, Kernen (DE); Ralph Seitter, Backnang (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 0 days.

(21) Appl. No.: 10/817,323

(22) Filed: Apr. 2, 2004

(65) Prior Publication Data

US 2004/0227121 A1 Nov. 18, 2004

Related U.S. Application Data

(63) Continuation of application No. PCT/EP02/13414, filed on Nov. 28, 2002.

(30) Foreign Application Priority Data

Nov. 30, 2001 (DE) ......................................... 101 59 680

(51) Int. Cl.[7] .............................. B05B 1/30; B08B 3/02
(52) U.S. Cl. .......................... 251/237; 251/231; 251/14; 239/525
(58) Field of Search .................. 251/14, 231, 233–237; 239/525

(56) References Cited

U.S. PATENT DOCUMENTS 2,283,541 A * 5/1942 Dodson ........................ 91/384
2,451,559 A * 10/1948 Kirkby ........................ 137/629
5,329,960 A    7/1994 Bello
5,695,120 A * 12/1997 Kingsford .................... 239/112
6,626,382 B1 * 9/2003 Liu ............................. 239/569

FOREIGN PATENT DOCUMENTS

| DE | 1 137 103 | 9/1962 |
| DE | 81 18 510 | 9/1981 |
| DE | 31 09 845 | 1/1982 |
| DE | 35 27 922 | 2/1987 |

\* cited by examiner

Primary Examiner—J. Casimer Jacyna
(74) Attorney, Agent, or Firm—Barry R. Lipsitz; Douglas M. McAllister

(57) ABSTRACT

In a closure device for the fluid delivery line of a high-pressure cleaning apparatus having arranged in the fluid delivery line a closure member which is pressed with a closing force against a valve seat and thereby closes the fluid delivery line, and which is liftable off the valve seat by a mechanical actuating element displaceable by a hand lever and extending in a sealed manner out of the fluid delivery line, when the hand lever is moved in the direction of an open position, in order to reduce the holding forces when the hand spray gun is open, it is proposed that downstream of the valve seat in the fluid delivery line a displaceably mounted piston extend in a sealed manner out of the fluid delivery line and upon being pushed out of the fluid delivery line cooperate with the hand lever in such a manner that the hand lever is moved in the direction towards its open position.

12 Claims, 2 Drawing Sheets

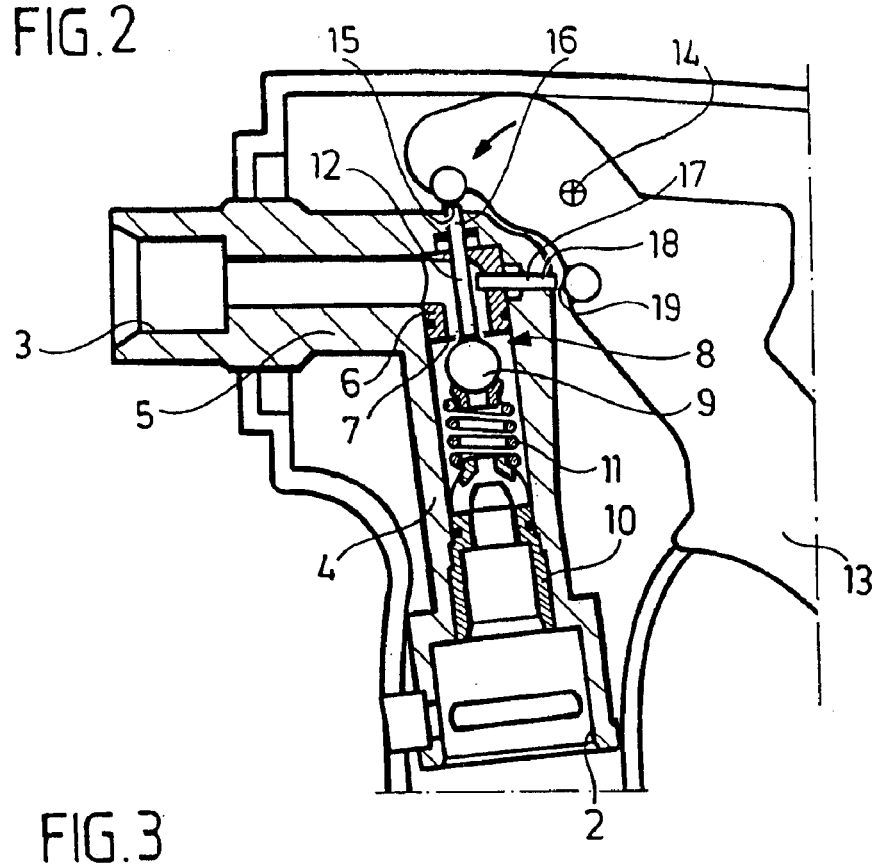
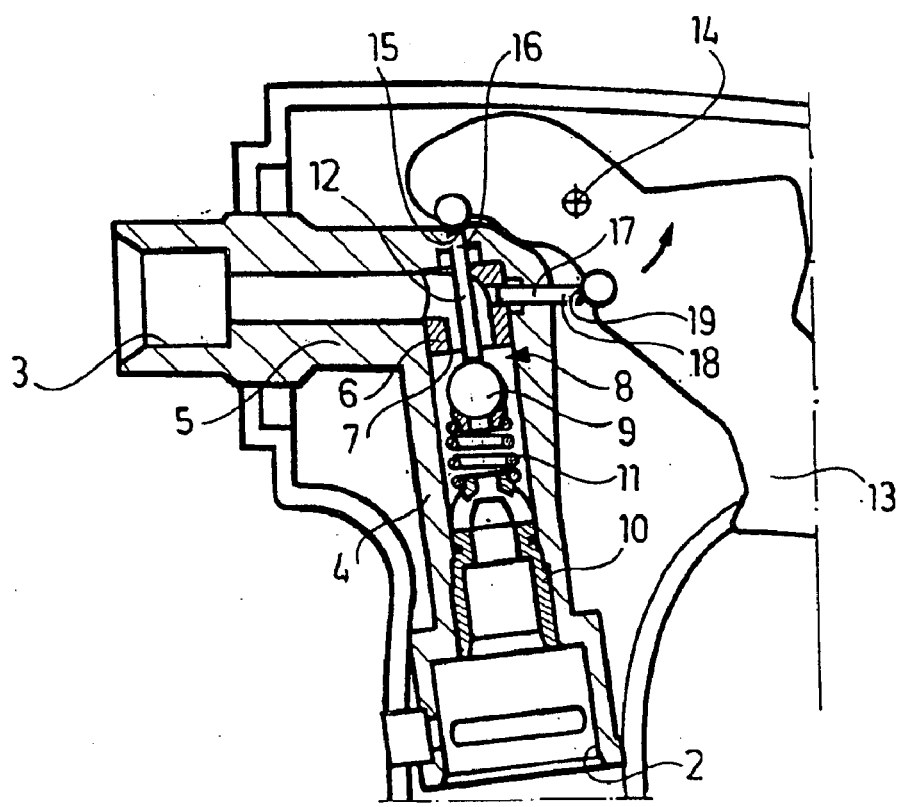

CLOSURE DEVICE FOR THE FLUID DELIVERY LINE OF A HIGH-PRESSURE CLEANING APPARATUS

This application is a continuation of PCT/EP02/13414 filed Nov. 28, 2002.

BACKGROUND OF THE INVENTION

The invention relates to a closure device for the fluid delivery line of a high-pressure cleaning apparatus having arranged in the fluid delivery line a closure member which is pressed with a closing force against a valve seat and thereby closes the fluid delivery line, and which is liftable off the valve seat by a mechanical actuating element displaceable by a hand lever and extending in a sealed manner out of the fluid delivery line, when the hand lever is moved in the direction of an open position.

Such closure devices are known, for example, from DE 81 18 510 U1 or from DE 35 27 922 C2. To ensure reliable closing of these closure devices, they are usually constructed in such a manner that during the opening the closure members are lifted off the valve seat against a relatively high force, and, therefore, opening for some time may prove tiring.

Special mechanical aids are, therefore, provided in the above-mentioned known closure devices to reduce the holding forces when the closure device is open. These are additional clamping devices or spring devices which engage the hand lever. However, these may be trouble-prone, especially when the closure devices are improperly handled or undergo aging processes.

The object of the invention is to so improve a generic closure device that the holding forces required after the opening of the closure device are reduced.

SUMMARY OF THE INVENTION

This object is accomplished with a closure device of the kind described at the outset, in accordance with the invention, in that downstream of the valve seat in the fluid delivery line a displaceably mounted piston extends in a sealed manner out of the fluid delivery line and upon being pushed out of the fluid delivery line cooperates with the hand lever in such a manner that the hand lever is moved in the direction towards its open position.

The piston mounted in the fluid delivery line is acted upon by the fluid in the fluid delivery line after the opening of the closure device, and this fluid is under increased pressure as the fluid usually passes out of the fluid delivery line through different nozzles which act as throttle and, therefore, ensure maintenance of an increased pressure in the fluid delivery line. This fluid under increased pressure thus displaces the piston mounted in the fluid delivery line outwards, so that this piston is moved out of the fluid delivery line. This movement is transferred onto the hand lever, more particularly, in such a manner that the hand lever is moved in the direction towards its open position. Under the action of the fluid pressure in the fluid delivery line, the piston thereby reinforces the opening movement of the hand lever, whereby the holding force is reduced. However, this reduction only occurs when the closure device is open, i.e., it is ensured that in the closed state the closure device is closed with a high closing force against which the user must consciously bring about an opening of the closure device, and, only after this opening has been brought about, does a fluid pressure build up in the area of the fluid delivery line arranged downstream of the closure valve, which can displace the piston such that the hand lever is moved in the opening direction, and, thus, only then does a relieving of the holding force occur.

With a hand lever which is mounted for swivel movement, it is advantageous for the piston according to a preferred embodiment of the invention, upon being pushed out of the fluid delivery line, to come to rest against the hand lever at a distance from its swivel axis and to swivel the hand lever upon being pushed further out.

The piston may, for example, be in the form of a cylindrical pin. In principle, however, all other shapes are also possible.

Provision is made in a preferred embodiment for the direction of displacement of the piston to extend substantially transversely to the direction of displacement of the actuating element.

It is expedient for the fluid delivery line to be angled, and for the piston and the actuating element to each extend out of the fluid delivery line in the extension of one of the sections of the fluid delivery line which adjoin the angle of the fluid delivery line.

In particular, provision may be made for the piston and the actuating element to be displaceable along the center axis of one of the two sections of the fluid delivery line which adjoin the angle of the fluid delivery line. A very space-saving arrangement is thereby obtained, with which the actuating element and the piston can be arranged in the angled area, more particularly, in such a manner that, upon being pushed out, both exert differently oriented torques on the hand lever.

The size of the force exerted by the piston on the hand lever depends on the cross section of the piston. The larger the cross section, the greater are these forces, as the piston is acted upon by the fluid under increased pressure inside the fluid delivery line, but only by the atmospheric ambient pressure on the outside. The size of the reduction of the holding force can thus be influenced by the choice of cross section of the piston. The size is selected by one skilled in the art such that under normal operating conditions when different pressures may prevail in the fluid delivery line, a reduction of the holding force does occur in all cases, but is only allowed to be of such size that upon releasing the hand lever, the closure member sits on the valve seat again and closes the fluid delivery line.

The following description of preferred embodiments of the invention serves in conjunction with the drawings to explain the invention in further detail.

BRIEF DESCRIPTION OF THE DRAWINGS

FIG. 2 shows an enlarged detail view of the closure device of the hand spray gun of FIG. 1 with the fluid delivery line represented in section in the longitudinal direction at the start of the opening procedure of the closure device; and FIG. 3 shows a view similar to FIG. 2 with the closure device open.

DETAILED DESCRIPTION OF THE INVENTION

Figure 1:
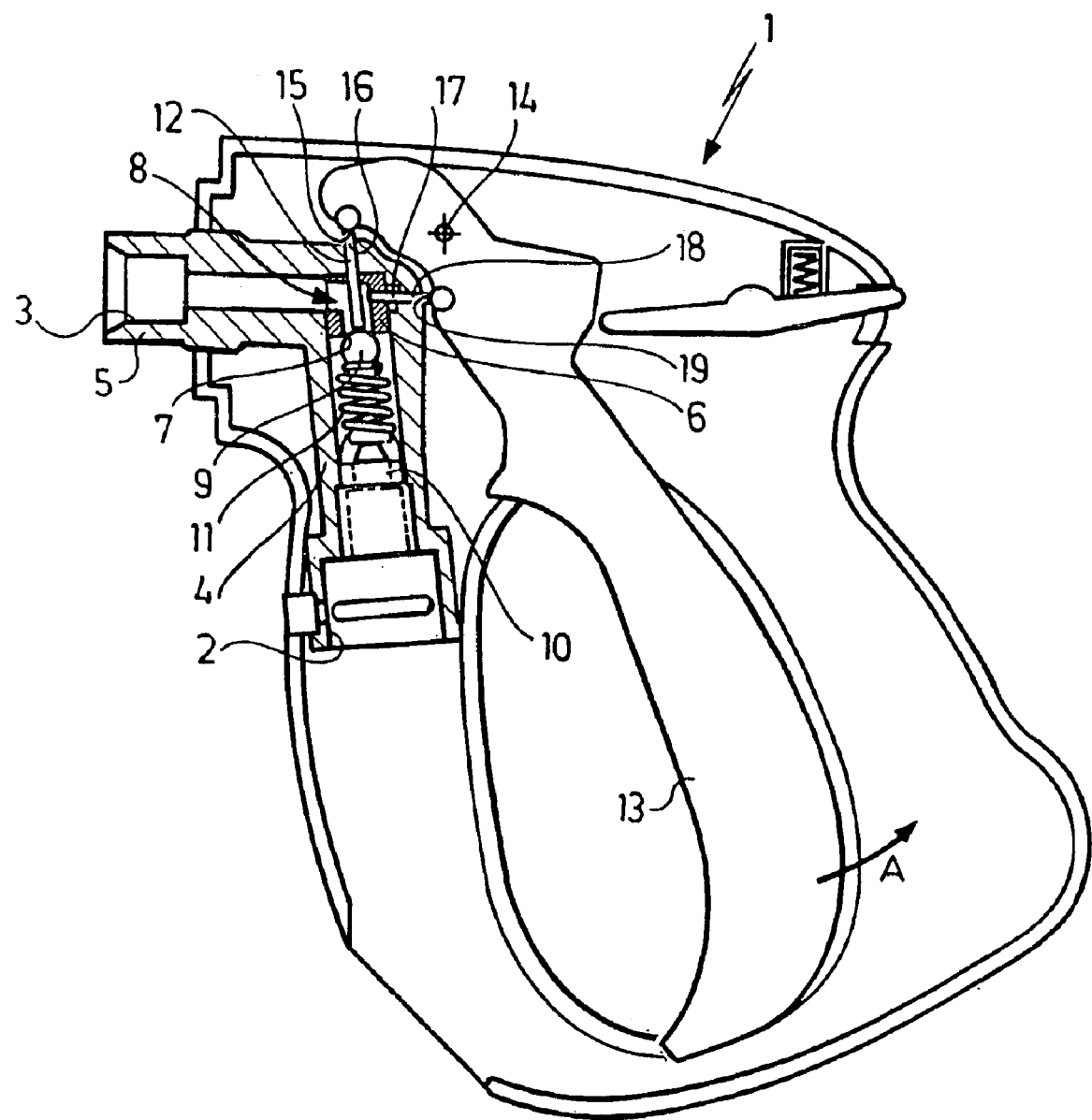
FIG. 1 shows a schematic side view of a hand spray gun of a high-pressure cleaning apparatus without the pipeline components connected thereto.

The drawings show merely the handle component of a hand spray gun 1. Such a hand spray gun 1 is normally connected to a fluid delivery line of a high-pressure cleaning apparatus. Herein a high-pressure hose, not shown in the drawings, is connected to an inlet 2, and a jet pipe, normally not flexible, with an outlet nozzle arranged at its end, is connected to an outlet 3. This jet pipe is not shown in the drawings. The hand spray gun 1 comprises a straight-lined pipe section 4 adjoining the inlet 2, and a further straight-lined pipe section 5 adjoining the pipe section 4 and thereby forming almost a right angle. The pipe section 5 leads to the outlet 3. A step-shaped constriction 6, which forms a valve seat 7 for a closure valve 8, is arranged in the area of transition between the pipe sections 4 and 5. This closure valve 8 comprises in addition to the valve seat 7 a spherical closure member 9 which is pressed by a helical spring 11 held on an insert 10 against the valve seat 7 and thereby closes the closure valve 8.

In the extension of the center axis of the pipe section 4, a pin-shaped actuating element 12 extends outwards in a sealed manner out of the fluid delivery line through the side wall of the pipe section 5. This actuating element is mounted in the side wall of the fluid delivery line for displacement in the longitudinal direction and extends through the constriction 6. In this area the actuating element 12 bears on the spherical closure member 9.

Outside of the two pipe sections 4, 5 in the hand spray gun 1, a hand lever 13 is mounted for swivel movement about a swivel axis 14 arranged on the hand spray gun 1. With a bearing surface 15, the hand lever 13 bears on the free end 16 of the actuating element 12 protruding from the pipe section 4. The arrangement of bearing surface 15 and swivel axis 14 is selected such that upon swivel movement of the hand lever 13 in the direction of arrow A in FIG. 1, the bearing surface 15 pushes the actuating element 12 into the fluid delivery line and thereby lifts the spherical closure member 9 off the valve seat 7 against the action of the helical spring 11, whereby the closure valve 8 is opened.

In the direction of the center axis of the pipe section 5, a pin-shaped piston 17 extends in a sealed manner through the wall of the pipe section 4 out of the fluid delivery line into the environment. In the area in which it extends outwards, this piston 17 is mounted for longitudinal displacement in the wall of the pipe section 4. When the piston 17 is pushed out, the free end 18 of the piston 17 located outside of the pipe section 4 comes to rest against a bearing surface 19 of the hand lever 13, more particularly, in such a manner that when the piston 17 is pushed out, the hand lever 13 is displaced in a direction towards its open position.

During operation of the illustrated hand spray gun 1, the closure valve 8 is normally closed under the action of the helical spring 11. The fluid present at the inlet 2 is under high pressure and thereby displaces the spherical closure member 9 additionally in the direction towards the valve seat 7, i.e., into the closed position.

To open the hand spray gun 1, the hand lever 13 must be swivelled in the direction of arrow A in FIG. 1. The hand lever 13 thereby presses the actuating element 12 into the fluid delivery line via the bearing surface 15 and lifts the spherical closure member 9 off its valve seat 7 against the action of the helical spring 11. The fluid present in the fluid delivery line can thus pass through the closure valve 8 to the outlet 3. An increased pressure in relation to the environment forms in the area of the fluid delivery line arranged downstream of the closure valve 8 as the pipeline components connected to the outlet 3, in particular, the outlet nozzles, act as a throttle. The piston 17 is also acted upon and pressed out of the fluid delivery line by this increased pressure downstream of the closure valve 8. It thereby swivels the hand lever 13 in opening direction, i.e., the opening movement of the hand lever 13 is thereby reinforced and the closing forces of the helical spring 11 are thereby at least partially compensated. Large opening forces are, in fact, necessary at the start for opening the closure valve 8. After the opening, these are first reduced by pressure forces of the fluid acting not only from the rear side but also from the front side on the spherical closure member 9 after the opening. These forces thus compensate one another partially after the opening. However, owing to the presence of the actuating element 12, the surface acted upon by the fluid is somewhat smaller in the direction opposite to the flow direction than in flow direction, with the result that these forces do not totally compensate one another when the closure member 9 is open. Moreover, the closure member 9 is acted upon by the helical spring 11.

By suitable choice of the cross section of the piston 17 these closing forces can be compensated to such an extent that the operator only requires low holding forces to keep the closure valve open, but, on the other hand, it is ensured that upon releasing the hand lever 13, the closure member 9 is reliably pressed onto the valve seat 7 again.

What is claimed is:

1. Closure device for the fluid delivery line of a high-pressure cleaning apparatus having arranged in the fluid delivery line a closure member which is pressed with a closing force against a valve seat and thereby closes the fluid delivery line, and which is liftable off the valve seat by a mechanical actuating element displaceable by a hand lever and extending in a sealed manner out of the fluid delivery line, when the hand lever is moved in the direction of an open position, wherein downstream of the valve seat in the fluid delivery line a displaceably mounted piston extends in a sealed manner out of the fluid delivery line and upon being pushed out of the fluid delivery line cooperates with the hand lever in such a manner that the hand lever is moved in the direction towards its open position.

2. Closure device in accordance with claim 1, wherein with a hand lever mounted for swivel movement, the piston, when pushed out of the fluid delivery line, comes to rest against the hand lever at a distance from its swivel axis and swivels the hand lever when pushed out further.

3. Closure device in accordance with claim 1, wherein the piston is in the form of a cylindrical pin.

4. Closure device in accordance with claim 1, wherein the direction of displacement of the piston extends substantially transversely to the direction of displacement of the actuating element.

5. Closure device in accordance with claim 2, wherein the direction of displacement of the piston extends substantially transversely to the direction of displacement of the actuating element.

6. Closure device in accordance with claim 1, wherein the fluid delivery line is angled, and the piston and the actuating element each extend out of the fluid delivery line in the extension of one of the sections of the fluid delivery line which adjoin the angle of the fluid delivery line.

7. Closure device in accordance with claim 2, wherein the fluid delivery line is angled, and the piston and the actuating element each extend out of the fluid delivery line in the extension of one of the sections of the fluid delivery line which adjoin the angle of the fluid delivery line.

8. Closure device in accordance with claim 3, wherein the fluid delivery line is angled, and the piston and the actuating element each extend out of the fluid delivery line in the extension of one of the sections of the fluid delivery line which adjoin the angle of the fluid delivery line.

9. Closure device in accordance with claim 4, wherein the fluid delivery line is angled, and the piston and the actuating element each extend out of the fluid delivery line in the extension of one of the sections of the fluid delivery line which adjoin the angle of the fluid delivery line.

10. Closure device in accordance with claim 6, wherein the piston and the actuating element are displaceable along the center axis of one of the two sections of the fluid delivery line which adjoin the angle of the fluid delivery line.

11. Closure device in accordance with claim 8, wherein the piston and the actuating element are displaceable along the center axis of one of the two sections of the fluid delivery line which adjoin the angle of the fluid delivery line.

12. Closure device in accordance with claim 9, wherein the piston and the actuating element are displaceable along the center axis of one of the two sections of the fluid delivery line which adjoin the angle of the fluid delivery line.

* * * * *